(12) United States Patent
Uehara (10) Patent No.: US 6,612,933 B2
(45) Date of Patent: Sep. 2, 2003

(54) DAMPER MECHANISM

(75) Inventor: Hiroshi Uehara, Hirakata (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/945,834

(22) Filed: Sep. 5, 2001

(65) Prior Publication Data

US 2002/0039925 A1 Apr. 4, 2002

(30) Foreign Application Priority Data

Sep. 29, 2000 (JP) ........................................ 2000-300334

(51) Int. Cl.⁷ .................................................. F16D 3/12
(52) U.S. Cl. ..................... 464/68; 192/213.22
(58) Field of Search ............................ 464/68, 64, 63; 192/213.2, 213.21, 213.22; 74/574

(56) References Cited

U.S. PATENT DOCUMENTS

| | | | | |
|---|---|---|---|---|
| 4,669,595 A | * | 6/1987 | Fischer et al. ......... | 192/213.22 |
| 4,892,008 A | * | 1/1990 | Naudin et al. .............. | 192/205 |
| 5,580,312 A | * | 12/1996 | Takeuchi et al. .............. | 464/68 |
| 5,609,526 A | * | 3/1997 | Kitayama et al. ............. | 464/68 |
| 6,089,983 A | * | 7/2000 | Lebas et al. ................... | 464/68 |
| 6,283,865 B1 | * | 9/2001 | Hashimoto et al. .... | 192/213.22 |
| 6,293,383 B1 | * | 9/2001 | Hoffmann et al. .......... | 192/204 |

FOREIGN PATENT DOCUMENTS

JP        H5-45259 A1    6/1993

* cited by examiner

*Primary Examiner*—Lynne H. Browne
*Assistant Examiner*—Kenneth Thompson
(74) *Attorney, Agent, or Firm*—Shinjyu Global IP Counselors, LLP (57) ABSTRACT

A damper mechanism is provided to achieve preferable vibration damping performances by providing different characteristics on positive and negative sides of torsion characteristics. In a damper mechanism of a clutch disk assembly 1, a plurality of coil springs 33 and 36 are arranged so that they are compressed when plates 12 and 13 rotate relatively to a hub 6 such that a higher torsional rigidity occurs on the positive side of the torsional angle range than the negative side. A friction generating mechanism 69 is arranged to generate friction when the plates 12 and 13 rotate relatively to the hub 6. The friction generating mechanism 69 generates a larger friction on the positive side of the torsion angle range than the negative side.

18 Claims, 9 Drawing Sheets

DAMPER MECHANISM

BACKGROUND OF THE INVENTION

1. Field of the Invention

This invention generally relates to a damper mechanism. More specifically, the present invention relates to a damper mechanism for transmitting a torque while absorbing and damping torsional vibrations.

2. Background Information

A damper mechanism used in a clutch disk assembly of a vehicle is formed of, e.g., an input rotary member, an output member, and an elastic coupling mechanism. The input rotary member is releasably coupled to an input flywheel. The output rotary member is coupled to an input shaft of a transmission. The elastic coupling mechanism elastically couples the rotary members in a rotating direction. The input rotary member is formed of a clutch disk and a pair of input plates fixed to the clutch disk. The output rotary member is formed of a hub, which is unrotatably and axially movably coupled to the transmission input shaft. The hub is formed of a cylindrical boss spline-engaged with the transmission input shaft and a radial flange formed around the boss. The elastic coupling mechanism is formed of a plurality of elastic member assemblies. Each elastic member assembly is formed of a coil spring only or a combination of a coil spring and seat members arranged on the opposite ends thereof. Each elastic member assembly is arranged in a window aperture formed in the flange, and is supported at its opposite ends in the rotating direction. Each elastic member assembly is supported in various directions by edges of windows formed in the input plate pair.

In the structure described above, when the input plate pair rotates relatively to the hub, the coil springs are compressed in the rotating direction between the input plates and the hub. Thereby, torsional vibrations supplied to the clutch disk assembly are absorbed and damped by the damper mechanism.

In general, noises generated from a drive system due to torsional vibrations are classified into groups each including noises during idling, noises during constant-speed driving, noises during acceleration and deceleration, and muffled or confined noises. For absorbing the torsional vibrations, which may cause these noises, it is therefore necessary to determine appropriate torsion characteristics in the damper mechanism. Therefore, conventional damper mechanisms have employed two-stage characteristics, in which a low rigidity and a low hysteresis torque are achieved in a region of a small torsion angle for absorbing vibrations during idling. In these conventional two-stage characteristics, the region of high torsion angles may be divided into a region exhibiting an intermediate rigidity and a high hysteresis torque for absorbing muffled noises as well as a region exhibiting a high rigidity and a high hysteresis torque for absorbing vibrations and noises during acceleration.

In an FF (Front-engine and Front-drive) vehicle, a drive system has a high rigidity so that a resonance point remains in a practical operation range even if the torsion rigidity is reduced for the purpose of improving performances for noises and vibrations. Characteristics of engine speed variations are different between the positive (acceleration) side and the negative (deceleration) side, but no difference is present in the conventional torsion characteristics between the positive and negative sides. Therefore, even if good damping performances can be achieved on one side, good damping characteristics cannot be achieved on the other side. Thus, good damping performances cannot be achieved overall.

In connection with the vibration damping performances relating to variations in rotation speed of the transmission with respect to the engine rotation speed, the hysteresis torque can suppress resonance on the positive side, but cannot achieve good damping rate in a positive range higher than the resonance point or throughout the whole negative range. Conversely, the low hysteresis torque can achieve good damping rates in the positive range higher than the resonance point and throughout the whole negative range, but can cause large variations in rotation speed at the positive resonance point.

As mentioned above, if the torsion characteristics on the positive side are similar to those on the negative side, and particularly if no difference is present in hysteresis torque between the positive and negative sides, it is impossible to provide the torsional damping characteristics, which are preferable over the whole range.

In view of the above, there exists a need for damper mechanism which overcomes the above mentioned problems in the prior art. This invention addresses this need in the prior art as well as other needs, which will become apparent to those skilled in the art from this disclosure.

SUMMARY OF THE INVENTION

An object of the invention is to achieve preferable vibration damping characteristics by providing different torsion characteristics on the positive and negative sides.

According to a first aspect, a damper mechanism includes a first rotary member, a second rotary member, a plurality of elastic members and a friction generating mechanism. The second rotary member is rotatable with respect to the first rotary member. The plurality of elastic members are arranged to be compressed when relative rotation occurs between the first and second rotary members in the rotating direction, and exhibit a higher rigidity on the positive side of the torsion characteristics than the negative side. The friction generating mechanism is arranged to generate friction when relative rotation occurs between the first and second rotary members, and generates a larger friction on the positive side of the torsion characteristics than the negative side.

This damper mechanism can provide characteristics, in which the rigidity and hysteresis torque are high on the positive side (acceleration side) of the torsion characteristics, and are low in the negative side (deceleration side) of the torsion characteristics. As a result, it is possible to suppress variations in rotation speed, which may occur when passing through the resonance point, on the positive side of the torsion characteristics. Also, good damping rates can be achieved throughout the negative side of the torsion characteristics.

According to a second aspect of the present invention, the damper mechanism of the first aspect further has a feature such that the friction generating mechanism has a first friction generating portion for generating friction at least on the negative side of the torsion characteristics, and a second friction generating mechanism for generating friction on the positive side of the torsion characteristics. Since the damper mechanism of this aspect has two friction generating portions for generating the friction on the positive and negative sides, respectively, the hysteresis torque on each of the positive and negative sides can be controlled independently of each other.

According to a third aspect of the present invention, the damper mechanism of the second aspect further has a feature such that the first friction generating portion operates on the positive and negative sides, and the second friction generating portion operates only on the positive side. In this damper mechanism, the first and second friction generating portions operate on the positive side, and only the first friction generating portion operates on the negative side.

According to a fourth aspect of the present invention, the damper mechanism of the second or third aspect further has a feature such that the first friction generating portion has a first friction member for generating friction between the first and second rotary members, and a first biasing member for biasing the first friction member. The second friction generating portion has a second friction member for generating friction between the first and second rotary members, and a second biasing member for biasing the second friction member. In this damper mechanism, each of the friction generating portions has a friction generating member and a biasing member. Therefore, when changing the rotational direction of the rotary members, the hysteresis torque can be independently controlled on the positive and negative sides.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
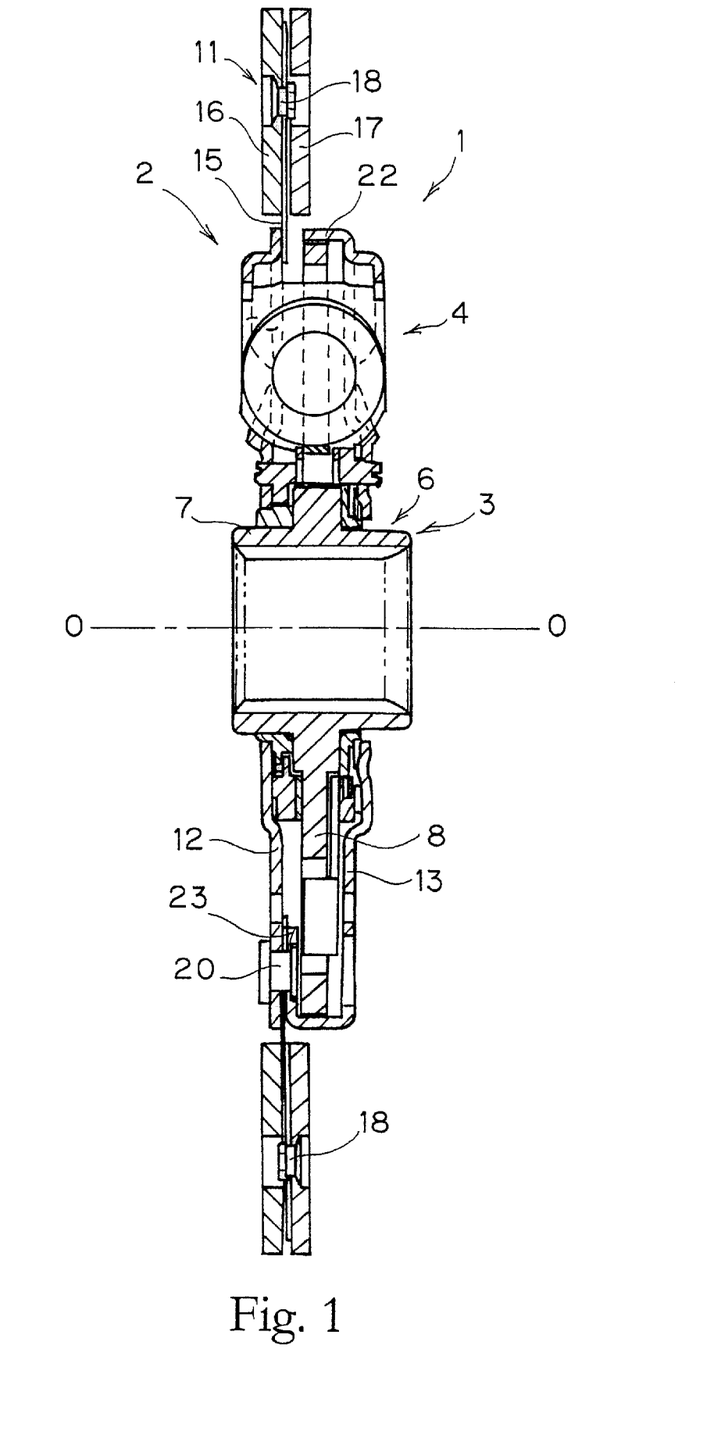
FIG. 1 is a cross-sectional view of a clutch disk assembly according to a first embodiment of the invention.
Figure 2:
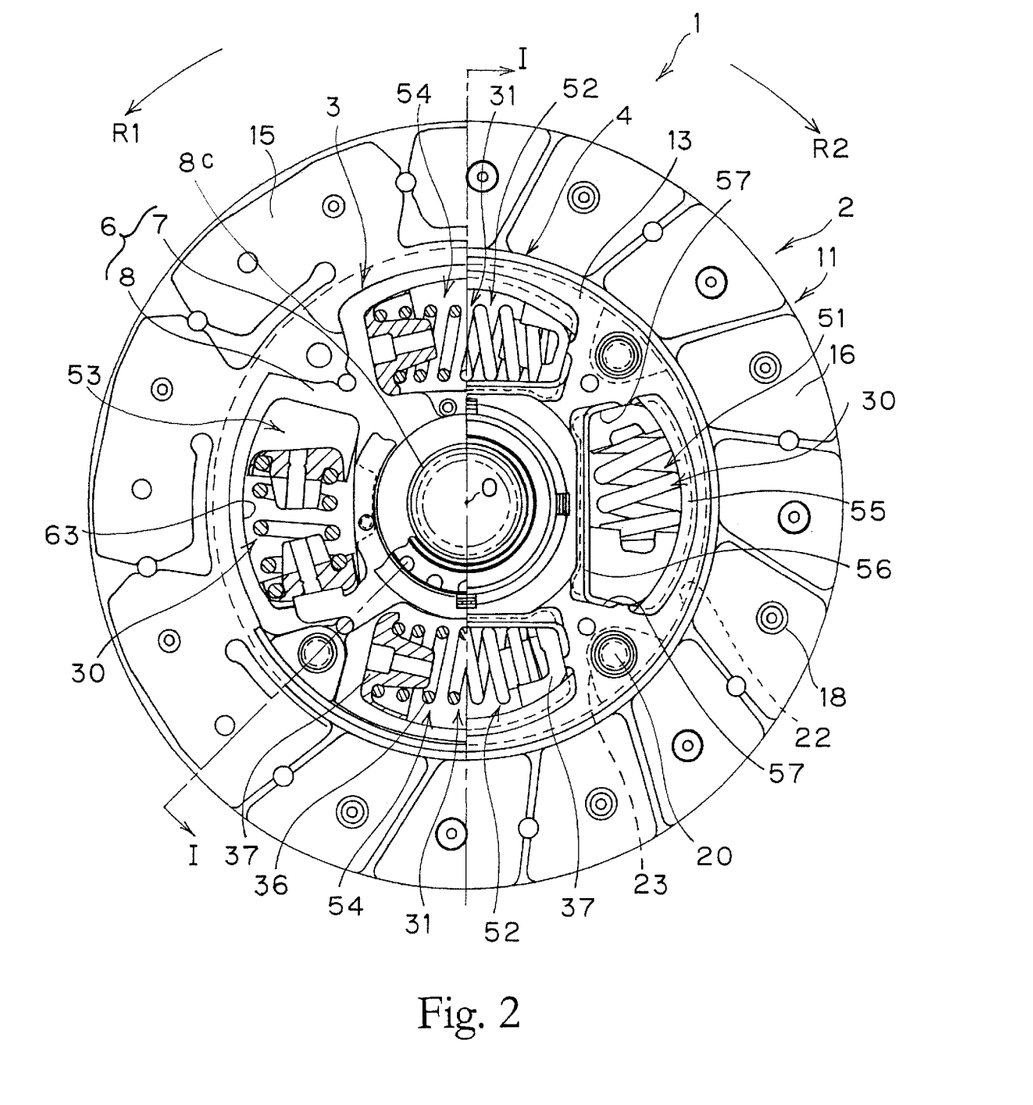
FIG. 2 is an elevational view of the clutch disk assembly of FIG. 1.

FIG. 1 is a cross-sectional view of a clutch disk assembly 1 of an embodiment of the present invention. FIG. 2 is an elevational view of the same. The clutch disk assembly 1 is a power transmission device used in a clutch device of a vehicle (particularly, a front-engine and front-drive vehicle), and has a clutch function and a damper function. The clutch function works selectively to transmit and intercept a torque by engaging with and disengaging from a flywheel (not shown). The damper function works to absorb and damp torque and other variations, which are applied from the flywheel side, by springs and other parts.

In FIG. 1, 0—0 represents a rotation axis of the clutch disk assembly 1. On the left side in FIG. 1, an engine and a flywheel (both not shown) are arranged. On the right side in FIG. 1, a transmission (not shown) is arranged. In FIG. 2, an arrow R1 indicates the drive side (positive rotating direction) of the clutch disk assembly 1, and an arrow R2 indicates an opposite side (negative rotation side). In the following description, the "rotating (circumferential) direction," "axial direction," and "radial direction" represent the respective directions of the clutch disk assembly 1 considered as the rotating body, unless otherwise specified.

Referring to FIGS. 1 and 2, the clutch disk assembly 1 is primarily formed of an input rotary member 2, an output rotary member 3, and an elastic coupling mechanism 4 arranged between the rotary members 2 and 3. These members and mechanism form a damper mechanism for damping torsional vibrations while transmitting a torque. The input rotary member 2 is configured to receive torque from the flywheel (not shown). The input rotary member 2 is primarily formed of a clutch disk 11, a clutch plate 12, and a retaining plate 13. The clutch disk 11 can be pressed against the flywheel (not shown) for engagement. The clutch disk 11 is formed of a cushioning plate 15 as well as a pair of friction facings 16 and 17 fixed to the axially opposite sides of the cushioning plate 15 by rivets 18.

The clutch and retaining plates 12 and 13 are both formed of circular plate members prepared by press working, and are axially spaced from each other by a predetermined distance. The clutch plate 12 is arranged on the engine side, and the retaining plate 13 is arranged on the transmission side. The retaining plate 13 is provided at its radially outer portion with a cylindrical wall 22 extending toward the clutch plate 12. A plurality of fixing portions 23 extend radially inward from the end of the wall 22. The fixing portions 23 are arranged on the side surface, on the transmission side, of the clutch plate 12, and are fixed thereto by a plurality of rivets 20. Thereby, the clutch and retaining plates 12 and 13 rotate together. Also, the above structure determines the axial space. Further, the rivets 20 fix the radially inner portion of the cushioning plate 15 to the fixing portion 23 and the radially outer portion of the clutch plate 12. Each of the clutch and retaining plates 12 and 13 is provided with a central aperture, in which a boss 7 is disposed, as will be described later. Each of the clutch and retaining plates 12 and 13 is provided with a plurality of windows 51 and 52 arranged in the circumferential direction. These windows 51 and 52 in each of the plates 12 and 13 have the same configuration and are preferably located in four positions, respectively, which are radially equal to but circumferentially equally spaced from each other. Each of the windows 51 and 52 is substantially circumferential long.

In FIG. 1, the windows in pair, which are laterally opposed to each other in FIG. 2, will be referred to as "first windows" 51, and the windows in pair, which are vertically opposed to each other in FIG. 2, will be referred to as "second windows" 52. Since the first and second windows 51 and 52 have the same configurations, the configurations of these windows will now be collectively described. Each of the first and second windows 51 and 52 is formed of a hole opened at its axially opposite ends and a support portion formed along the edge of the hole. The support portion has a radially outer support portion 55, a radially inner support portion 56 and circumferential end support portions 57. In an elevational view, the radially outer support portion 55 is curved substantially circumferentially, and the radially inner support portion 56 has a substantially straight form. Each of the circumferential end support portions 57 extends substantially linearly in the radial direction, but is not parallel to a line extending through a circumferential center of the window 51 or 52 and the center O of the clutch disk assembly 1. The circumferential end support portion 57 is inclined so that the radially inner end thereof is preferably shifted circumferentially inward (toward the circumferential center of the window 51 or 52) with respect to the radially outer end. Therefore, the circumferential end support portions 57 on the opposite sides of each window 51 or 52 are not parallel to each other. The radially outer support portion 55 and radially inner support portion 56 are formed by partially cutting and bending the plates.

Figure 4:
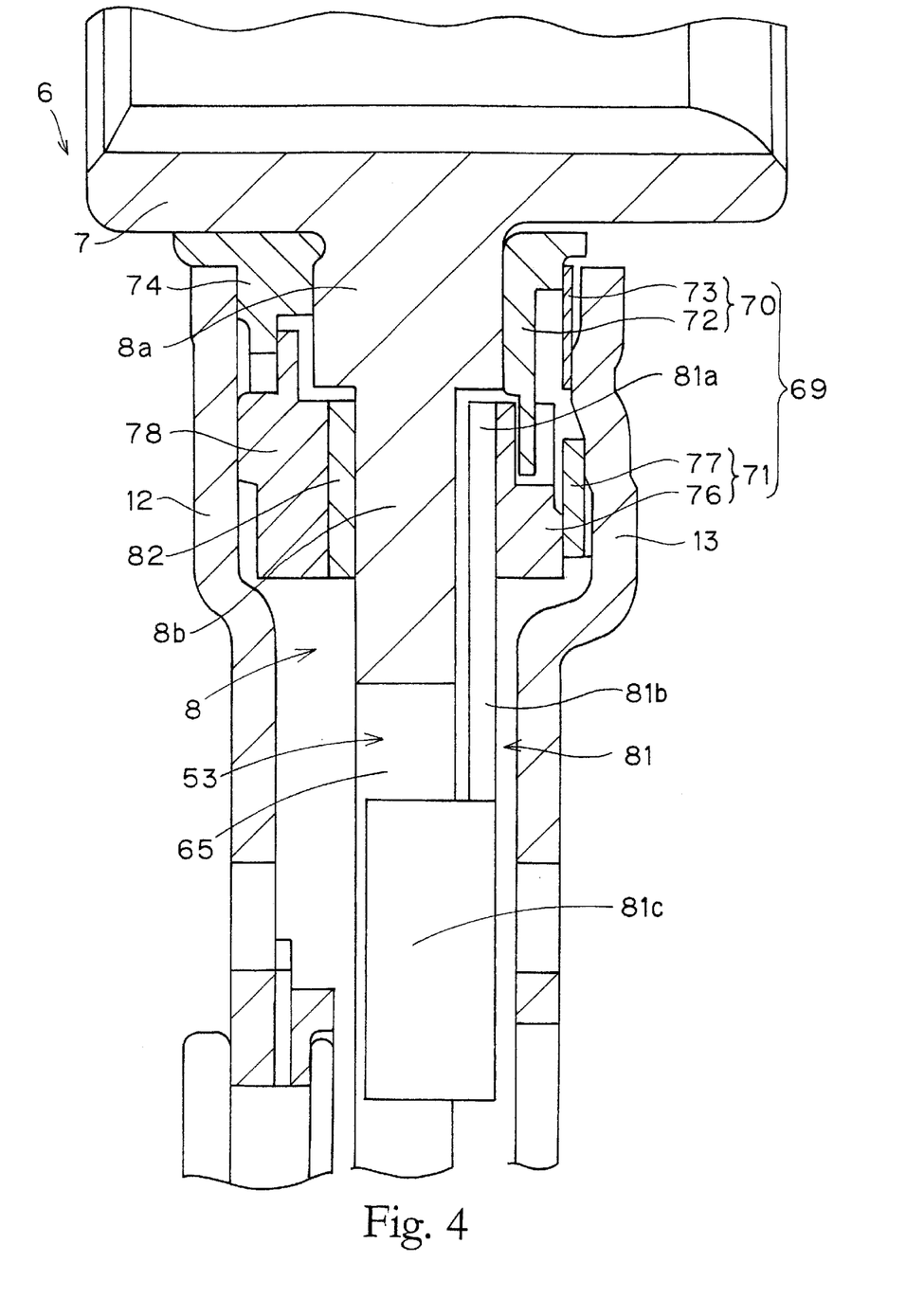
FIG. 4 is a partial cross-sectional view showing, on an enlarged scale, a friction generating mechanism shown in FIG. 1.
Figure 5:
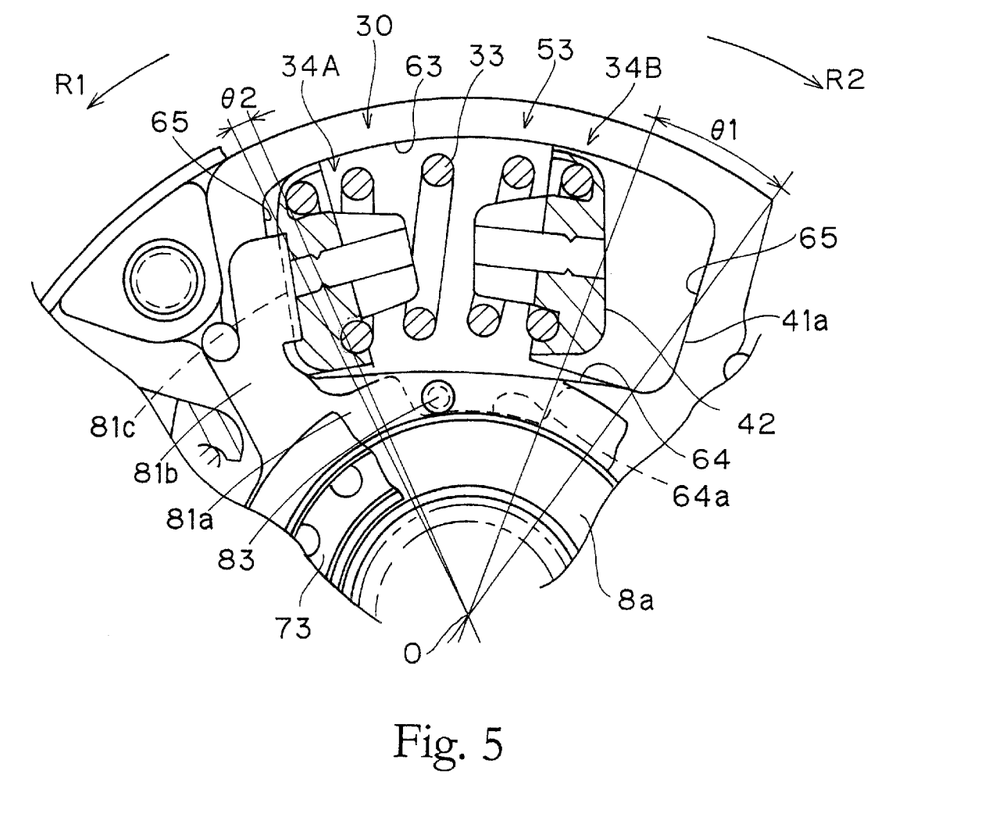
FIG. 5 is a partial cross-sectional elevational view showing, on an enlarged scale, a first elastic member assembly shown in FIG. 2.

Description will now be given on the output rotary member 3 shown in FIG. 1. The output rotary member 3 is primarily formed of a hub 6. The hub 6 is formed of a boss 7 and a flange 8. The boss 7 has a cylindrical form, and is disposed within the central apertures of the clutch and retaining plates 12 and 13. The boss 7 is spline-engaged with a transmission input shaft (not shown) fitted into the central aperture. The flange 8 is formed integrally and radially around the boss 7, and has a circular plate-like form. The flange 8 is arranged axially between the clutch and retaining plates 12 and 13. Referring to FIG. 4, the flange 8 is formed of a radially inner portion 8a and a radially outer portion 8b having a smaller axial size or thickness than the inner portion 8a. As seen in FIG. 2, the flange 8 is provided at its radially outer portion 8b with window apertures 53 and 54 corresponding to the first windows 51 and 52. These window apertures 53 and 54 are preferably located in the four positions, respectively, which are located in the same radial position equal to each other and are circumferentially equally spaced from each other. In FIG. 2, the window apertures in pair, which are laterally opposed to each other, will be referred to as the "first window apertures" 53, and the window apertures in pair, which are vertically opposed to each other in FIG. 2, will be referred to as the "second window apertures" 54. Since the first and second window apertures 53 and 54 have the same configurations, these configurations will now be collectively described. Each of the window apertures 53 and 54 is open at the axially opposite ends, is prepared by axial press working and is circumferentially long. As seen in FIG. 5, each of the window apertures 53 and 54 has a radially outer support portion 63, a radially inner support portion 64, and circumferential end support portions 65. In an elevational view, the radially outer support portion 63 is curved substantially circumferentially, and the radially inner support portion 64 has a substantially straight form. Each of the circumferential end support portions 65 extends substantially linearly in the radial direction, but not parallel to a line extending through a circumferential center of the window aperture 53 or 54 and the center O of the clutch disk assembly 1. The circumferential end support portion 65 is inclined so that the radially inner end may be shifted circumferentially inward with respect to the radially outer end.

The foregoing structures can be summarized as follows.

(1) The windows or window apertures in each rotary member have the same configurations.

(2) As shown in FIG. 2, the windows and the window apertures (e.g., the first window aperture 53 and the first window 51, and the second window aperture 54 and the second window 52), which are axially opposed to each other, have the same configurations, and are axially aligned to each other.

As seen in FIG. 2, the flange 8 is provided at its radially outer edge with recesses 8c, through which the fixing portions 23 of the retaining plate 13 extend axially. Each recess 8c is located circumferentially between the window apertures 53 and 54.

The elastic coupling mechanism 4 is formed of a plurality of elastic member assemblies 30 and 31. The elastic member assemblies 30 and 31 employed in this embodiment are preferably four in number. The elastic member assemblies 30 and 31 are arranged within the first window apertures 53 and 54 as well as first windows 51 and 52. The elastic member assemblies 30 and 31 are formed of two kinds of assemblies, i.e., first elastic member assemblies 30 each arranged within the first window aperture 53 and the first window 51, and second elastic member assemblies 31 each arranged within the second window aperture 54 and the second window 52.

As seen in FIG. 5, the first elastic member assembly 30 is formed of a first coil spring 33 and a pair of seat members 34A and 34B arranged on the opposite ends of the spring 33. The first coil spring 33 has a circular section. Each end of the first coil spring 33 is closed and forms an end turn. However, the surface of each end turn is not subjected to polishing, and maintains the sectional form of the coil wire. The "end turn" in this embodiment is the same as one turn of each end of the first coil spring 33. The seat members 34A and 34B are made of hard resin or elastic resin material. For example, the elastic resin material may be thermoplastic polyester elastomer. Within the first window aperture 53, the seat member located on the R1 side, i.e., forward side in the rotating direction R1 will now be referred to as a "first seat member" 34A, and the seat member on the opposite side will now be referred to as a "second seat member" 34B. A structure of the second seat member 34B will now be described, and subsequently the first seat member 34A will be described based on the description of the second seat member 34B.

Figure 6:
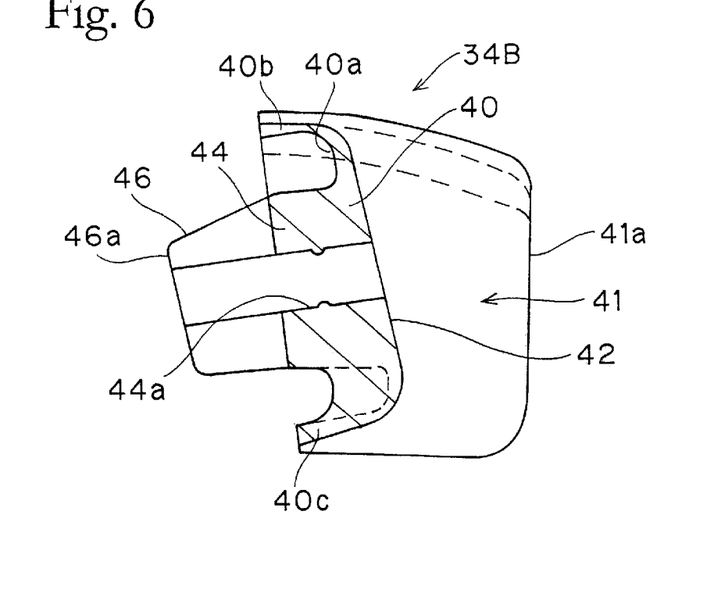
FIG. 6 is a cross-sectional elevational view of a first seat member shown in FIG. 2.
Figure 7:
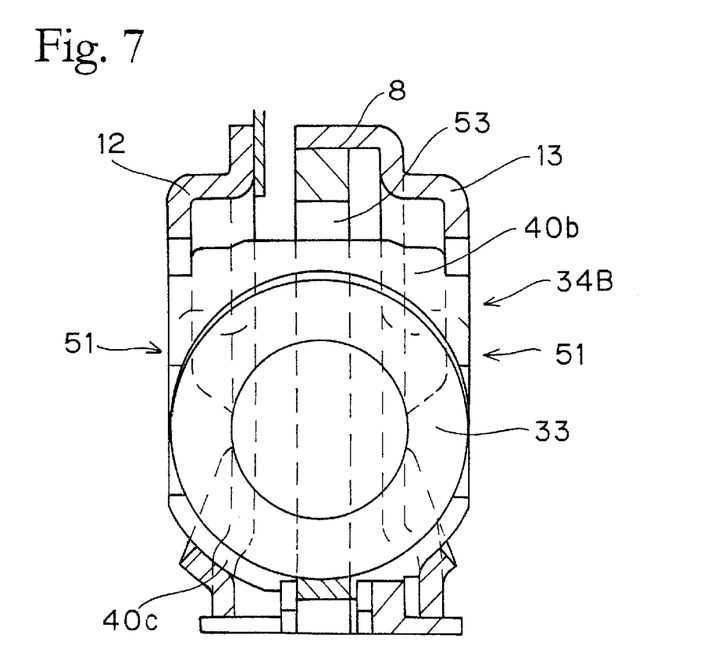
FIG. 7 is a partial cross-sectional view showing, on an enlarged scale, the first elastic member assembly shown in FIG. 1.
Figure 8:
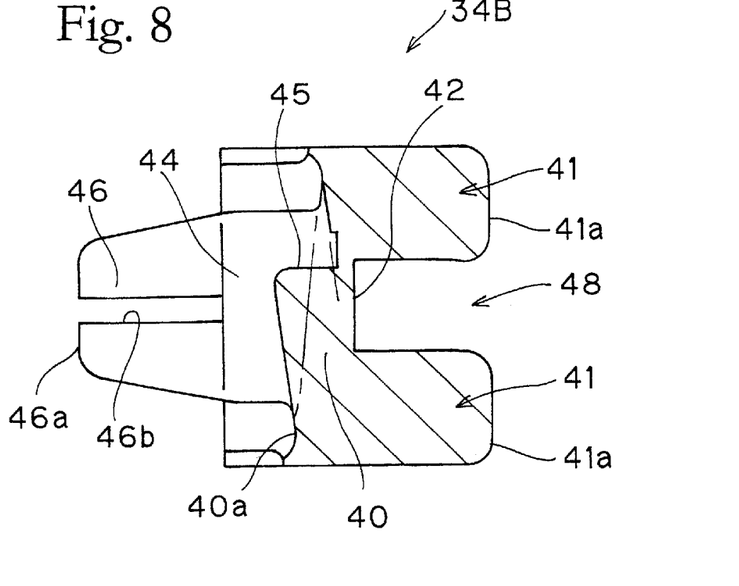
FIG. 8 is a cross-sectional plan view of the first seat member shown in FIG. 2.

As shown in FIGS. 5 and 6, the second seat member 34B is provided with a seat portion 40 having a seat surface 40a for receiving an end turn surface of the first coil spring 33. The seat portion 40 is provided at its seat surface with a columnar projection 44 so that the seat surface 40a has an annular form. The seat surface 40a has a first half circle having a substantially flat form as well as a second half circle having a height relative to a plane that extends substantially parallel to a second contact surface 42. The second half circle gradually increases as the position moves counterclockwise in a plan view from one end toward the other. One end of the second half circle is continuous to the first half circle, and the other end thereof provides a stepped portion with respect to the first half circle. In the stepped portion as shown in FIGS. 5 and 8, the seat surface 40a forms a contact surface 45 substantially perpendicular to the circumferential direction (i.e., surface 45 facing counterclockwise in the plan view). The seat surface 40a has a configuration corresponding to that of the end turn of the first coil spring 33, and the contact surface 45 is in contact with the leading end surface of the end turn. Thereby, the first coil spring 33 cannot rotate around its own axis with respect to the first seat member pair 34A and 34B. The contact surfaces 45 of the opposite seat members 34A and 34B are directed oppositely to each other in the directions of turn of the first coil spring 33. Therefore, the first coil spring 33 can turn in neither direction around the central axis.

The projection 44 is further provided with a projected contact portion 46. The contact portion 46 has an axial section converging toward the end, and is provided at its end with a flat contact surface 46a. As seen in FIG. 6, the seat portion 40, projection 44, and contact portion 46 are provided at their centers with an aperture 44a extending substantially in the circumferential direction and having a circular section. As best seen in FIG. 8, the contact portion 46 is provided with a slit 46b extending axially to divide it into two portions axially spaced from each other.

On the end remote from the seat surface 40a, the seat portion 40 is provided with a pair of projections 41, which are located on the axially opposite portions and extend in the rotating direction. The end surface of the projection 41 forms a first contact surface 41a. In other words, the seat portion 40 is provided with a slit 48, which axially divides the circumferentially outer portion. The second contact surface 42 is formed axially between the projections 41. Thus, the second contact surface 42 is located circumferentially inside the first contact surface 41a. Referring now to FIGS. 2 and 8, the first surface 41a is located in contact with or close to the circumferential end support portions 57 of the first windows 51 in the plates 12 and 13, and is supported in the rotating direction. As seen in FIG. 5, the second contact surface 42 is spaced by a predetermined angle θ1 of, e.g. 15 degrees from the circumferential end support portion 65 of the first window aperture for support in the rotating direction.

Further, as seen in FIGS. 5 and 6, the seat portion 40 is provided at its circumferentially inner portion with a radially outer support portion 40b for supporting the radially outer and axially opposite portions of the end turn of the first coil spring 33 as well as a radially inner support portion 40c for supporting the radially inner and axially opposite portions of the end turn of the first coil spring 33.

As seen in FIGS. 2 and 6, the second seat portion 34B has a radially outer portion of an arc-shaped section extending along the radially outer support portions 55 and 63. The axial movement of the second seat member 34B is restricted by the radially outer support portion 55 and radially inner support portion 56 of the first window 51.

Figure 9:
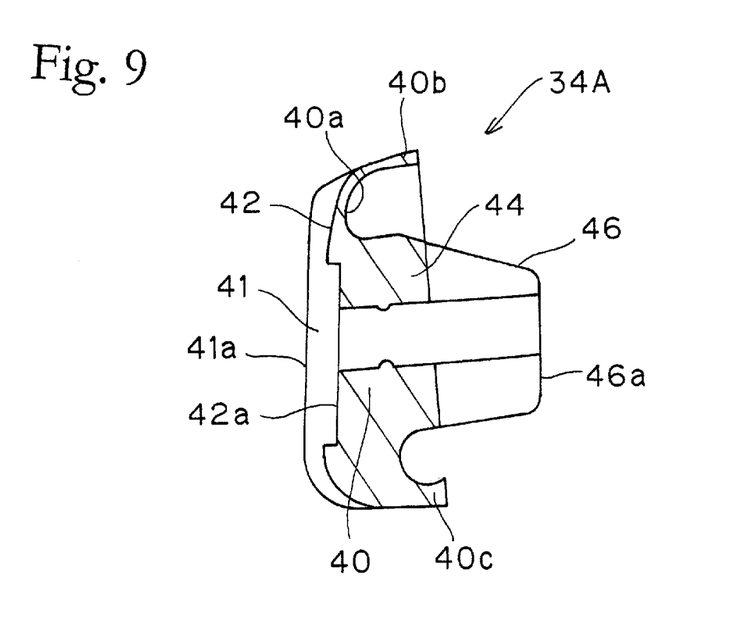
FIG. 9 is a cross-sectional elevational view of a second seat member shown in FIG. 2.

Description will now be given on the structure of the first seat member 34A. As shown in FIG. 9, the first seat member 34A has the substantially same configuration and structure as the second seat member 34B and only differences therebetween will be explained. The paired projections 41 of the first seat member 34A project a smaller amount in the rotating direction than those of the second seat member 34B. Therefore, the second contact surface 42 of the first seat member 34A is spaced by an angle of θ2 in the rotating direction from the circumferential end support portion 65 of the first window aperture 53 in the flange 8 as shown in FIG. 5. The angle θ2 is much smaller than the angle θ1, and is preferably equal to 2 degrees in this embodiment. Referring again to FIG. 9, the second contact surface 42 is provided with a shallow concavity 42a in the rotating-direction.

As shown in FIG. 5, the number of active turns of the first coil spring 33 is preferably four on the radially inner side, and is three on the radially outer side. Thus, the number of active turns on the radially inner side is larger by one than that on the radially outer side. Since the first coil spring 33 cannot rotate around its own axis, the above state is maintained. This is because the opposite ends of the first coil spring 33 are unrotatably engaged with the seat members 34A and 34B for preventing rotation around its own axis, respectively. Further, the seat members 34A and 34B are unrotatably engaged with the circumferential end support portions 65 of the flange 8 and the circumferential end support portions 57 (shown in FIG. 2) of the plates 12 and 13 for preventing its own rotation around the axis of the first coil spring 33. Since the number of active turns on the radially inner side is larger than that on the radially outer side as described above, excessively large stress can be dispersed. Since a large amount of deformation occurs in the radially outer portion and moves into various portions on the radially inner side differences in stress between the radially inner and outer portions can be reduced.

As seen in FIG. 2, description will now be given on the second elastic member assembly 31. The second elastic member assembly 31 is formed of a second coil spring 36 and third seat members 37, which are arranged on the opposite ends in the rotating direction of the second coil spring 36, respectively. The second coil spring 36 has a circular section. The opposite ends of the second coil spring 36 are formed of the closed end turns, respectively. However, the surface of the end turn is not polished, and maintains the sectional form of the coil wire. The above "end turn" is a portion corresponding to one turn at each end of the second coil spring 36. The second coil spring 36 is equal in coil diameter, coil wire diameter and pitch to the first coil spring 33, but is different in the number of turns so that the second coil spring 36 is circumferentially longer than the first coil spring 33.

The seat member 37 has forms similar to those of the seat members 34A and 34B already described. However, the seat portion of the third seat member 37 is not provided with a slit located at the outer side in the rotating direction. Therefore, the third seat member 37 is located also in contact with or close to the circumferential end support portion 65 of the second window aperture 54 in the flange 8.

As seen in FIG. 4, the clutch disk assembly 1 further includes a friction generating mechanism 69, which is arranged to operate in parallel with the elastic coupling mechanism 4. The friction generating mechanism 69 has a first friction generating portion 70 for generating a low hysteresis torque and a second friction generating portion 71 for generating a high hysteresis torque.

The first friction generating portion 70 is employed for generating hysteresis torque over the entire region of the operation of the elastic coupling mechanism 4, and thus on both the positive and negative sides of the torsion characteristics. The first friction generating portion 70 has a first bushing 72, a first conical spring 73 and a second bushing 74. The first bushing 72 and the first conical spring 73 are arranged between the radially inner portion 8a of the flange 8 and the radially inner portion of the retaining plate 13. The first bushing 72 is a washer-like member, and has a friction surface, which is in slidable contact with the side surface, on the transmission side, of the radially inner portion 8a of the flange 8. The first conical spring 73 is arranged axially between the first bushing 72 and the radially inner portion of the retaining plate 13, and is axially compressed. The second bushing 74 is an annular member attached to the inner periphery of the clutch plate 12, and has an inner peripheral surface in contact with the outer peripheral surface of the boss 7. Thereby, the clutch and retaining plates 12 and 13 are radially positioned with respect to the hub 6. The second bushing 74 has a friction surface, which is in slidable contact with the side surface, on the engine side, of the radially inner portion 8a of the flange 8.

According to the structure described above, the first friction generating portion 70 operates such that the first and second bushings 72 and 74 (first friction members), which rotate together with the clutch and retaining plates 12 and 13, are axially pushed against the flange 8 by the elastic force of the first conical spring 73 (first biasing member), and therefore are slidable in the rotating direction.

Figure 3:
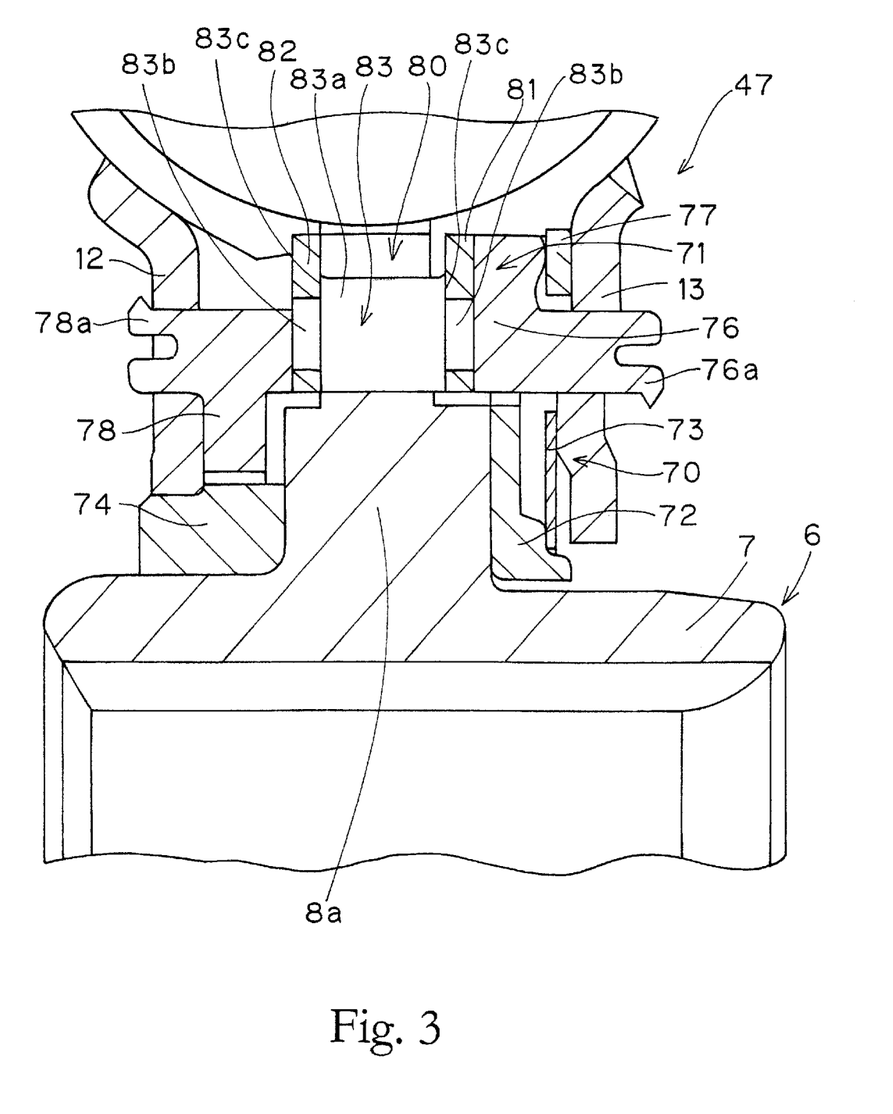
FIG. 3 is a partial cross-sectional view showing, on an enlarged scale, a friction generating mechanism shown in FIG. 1.

As seen in FIGS. 3 and 4, the second friction generating portion 71 is formed of a third bushing 76, a second conical spring 77, a fourth bushing 78, and a float member 80.

The float member 80 is provided for allowing operation of the second friction generating portion 71 on the positive side of the torsion characteristics but inhibiting the operation on the negative side. More specifically, the float member 80 provides the friction surface of the second friction generating portion 71 with respect to the input rotary member 2, and is rotatable with respect to the flange 8 through a predetermined angular range. However, the float member 80 is engageable only from one side in the rotating direction. More specifically, it is engageable only on the positive side of the torsion characteristics, and is not engageable on the negative side. The float member 80 is formed of a first plate member 81, a second plate member 82 and pins 83. The first and second plate members 81 and 82 have annular forms, and are located on the axially opposite sides of the radially inner portion of the flange. More specifically, the first and second plate members 81 and 82 are located on the axially opposite sides of the radially innermost annular portion of the radially outer portion 8b located radially between the radially inner portion 8a and the window apertures 53 and 54. The first plate member 81 is arranged on the transmission side with respect to the flange 8, and the second plate member 82 is arranged on the engine side with respect to the flange 8. The pin 83 has an axial shank 83a and fitting portions 83b, which extend axially from the opposite ends of the shank 83a, respectively. The fitting portion 83b is smaller in diameter than the shank 83a such that shoulders 83c are formed at the axially opposite ends of the shank 83a. The first and second plate members 81 and 82 are provided with apertures for fitting the fitting portions 83b thereinto. Owing to this fitting, the first and second plate members 81 and 82 rotate together. The shoulders 83c of the shank 83 are axially in contact with the first and second plate members 81 and 82, respectively. This fixes the axial distance between the first and second plate members 81 and 82. Since the axial length of the shank 83a is larger than the axial thickness of the flange 8, the axially opposite surfaces of the radially outer portion 8b of the flange 8 are not simultaneously in contact with the first and second plate members 81 and 82, and the radially outer portion 8b of the flange 8 in FIG. 3 is axially spaced from the first plate member 81 on the transmission side thereof. The pins 83 are arranged in the two diametrally opposite positions, and extend through recesses 64a in the first window apertures 53, respectively as seen in FIG. 5. The recess 64a extends radially inward from the radially inner support portion 64 of the first window aperture 53, and has a predetermined length in the rotating direction. The pin 83 in the recess 64a is shifted in the rotating direction R1. As will be described later, the float member 80 is rotatable with respect to the hub 6 through a predetermined angle, and the recess 64a has the circumferential length, which prevents interference between the edge of recess 64a and the pin 83 during the relative rotation through the above range.

As seen in FIGS. 4 and 5, the first plate member 81 is formed of an annular portion 81a engaged with the pin 83, a pair of arms 81b extending radially outward from the annular portion 81a, and a claw 81c extending axially from the end of the arm 81b. Each arm 81b has an end located near the forward end, in the rotating direction R1, of the first window aperture 53 in the flange 8. The arm 81b has a configuration, which allows insertion thereof in the rotating direction R2 into a space between the paired projections 41 of the first seat member 34A, and is provided at its end with the claw 81c extending in the axial direction. The claw 81c is fitted into the concave portion 42a formed on the second contact surface 42 of the first seat member 34A. Therefore, the claw 81c is flush with the second contact surface 42. Thus, the claw 81c is spaced by the angle of θ2 in the rotating direction from the circumferential end support portion 65, on the forward side in the rotating direction R1, of the first window aperture 53. The second contact surface 42 can be spaced in the rotating direction R2 from the claw 81c.

The third bushing 76 and the second conical spring 77 are arranged axially between the annular portion 81a of the first plate member 81 and the radially inner portion of the retaining plate 13, and thus are arranged radially outside the first bushing 72 and the first conical spring 73. The third bushing 76 has a friction surface in contact with the side surface of the first plate member 81 on the transmission side. As seen in FIG. 3, the third bushing 76 has projections 76a, which extend axially from the annular body, and are fitted into apertures formed in the retaining plate 13. Owing to this fitting, the third bushing 76 is axially movable but is unrotatable with respect to the retaining plate 13. The second conical spring 77 is arranged axially between the third bushing 76 and the radially inner portion of the retaining plate 13, and is axially compressed between them. The third bushing 76 is provided with concavities engaging in the rotating direction with the projections extending from the first bushing 72. Owing to this engagement, the first bushing 72 rotates together with the third bushing 76 and the retaining plate 13.

Referring to FIGS. 3 and 4, the fourth bushing 78 is arranged between the second plate member 82 and the radially inner portion of the clutch plate 12, and thus is arranged radially outside the second bushing 74. The fourth bushing 78 has a friction surface in contact with the radial surface on the engine side of the second plate member 82. The fourth bushing 78 is provided with a plurality of projections 78a extending axially from the annular body toward the engine. The projection 78a is fitted into an aperture formed in the clutch plate 12 so that the fourth bushing 78 is axially movable but is unrotatable with respect to the clutch plate 12.

Owing to the above structure, the second friction generating portion 71 operates such that the third and fourth bushings 76 and 78 (second friction members), which rotate together with the clutch and retaining plates 12 and 13, are axially pressed against the float member 80 by the elastic force of the second conical spring 77 (second biasing member), and is slidable in the rotating direction. The hysteresis torque generated by the second friction generating portion 71 is preferably 10–20 times larger than the hysteresis torque generated by the first friction generating portion 70.

Figure 10:
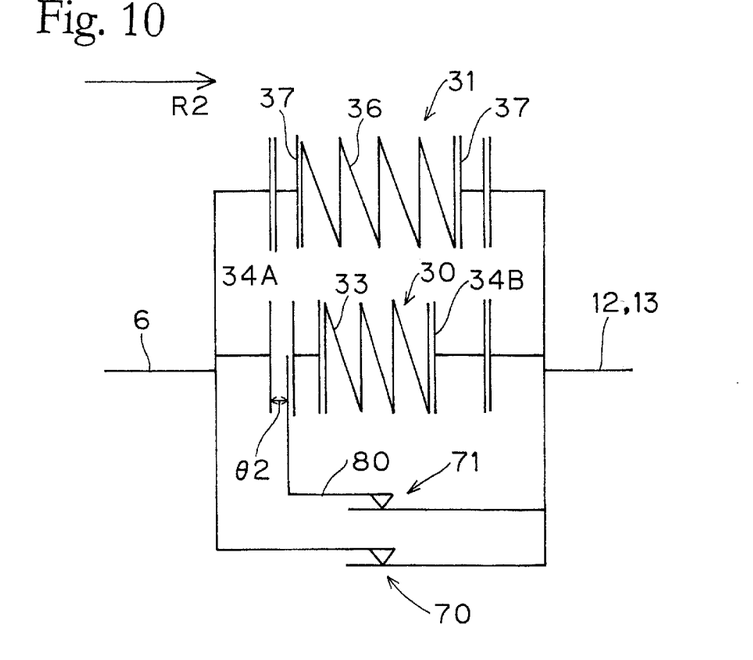
FIG. 10 is a schematic view of a damper mechanism of the clutch disk assembly of FIG. 1.
Figure 11:
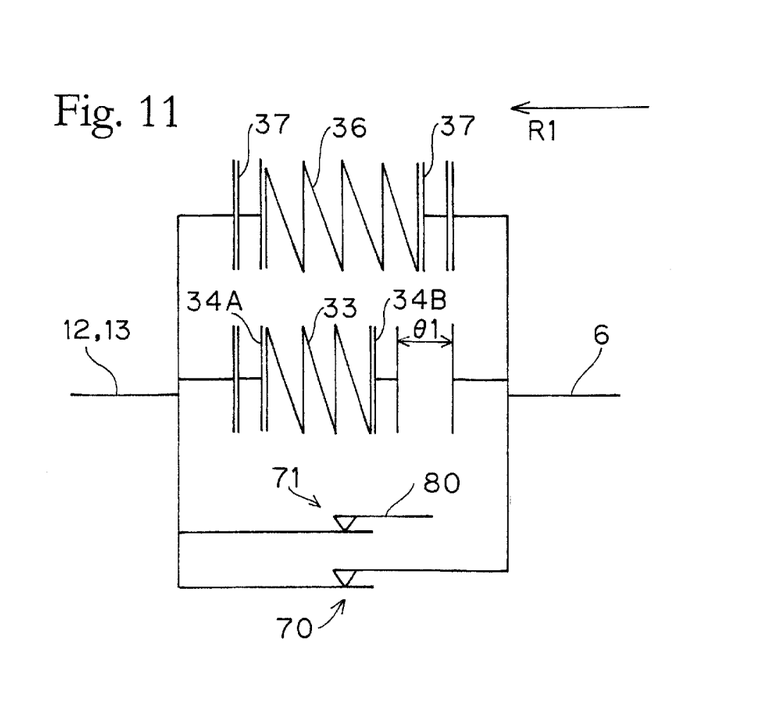
FIG. 11 is a schematic view of the damper mechanism of the clutch disk assembly of FIG. 1.
Figure 12:
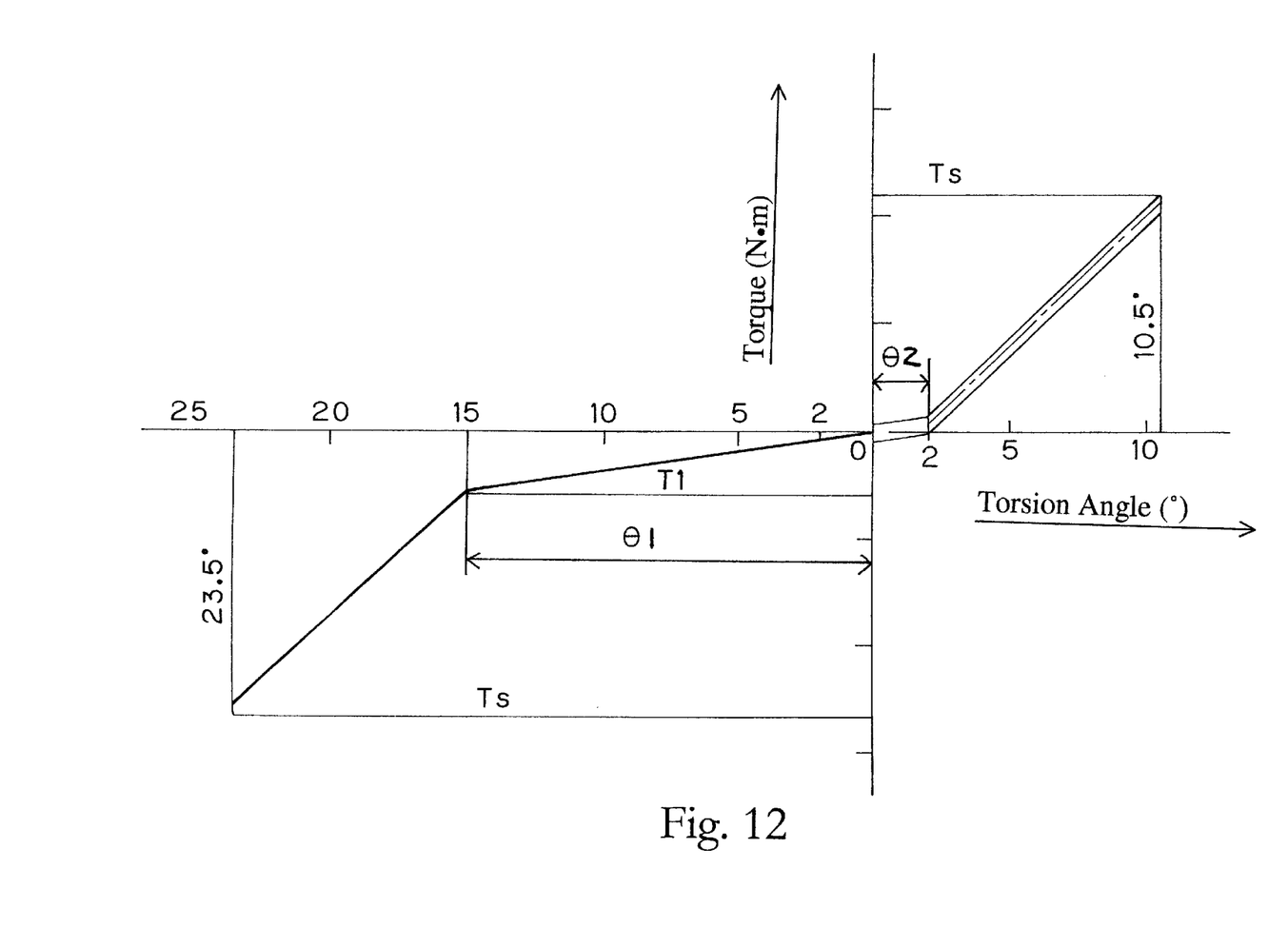
FIG. 12 is a diagrammatical view showing torsion characteristics of the clutch disk assembly of FIG. 1.

Referring to FIGS. 5, 10, and 11, which schematically show the damper mechanism, as well as FIG. 12, which shows the torsion characteristics, description will now be given on the torsion characteristics of the clutch disk assembly 1. The values in FIG. 12 are represented merely as examples, and are not intended to restrict the invention thereto.

First, description will be given in the operation starting from the neutral state in FIG. 10 and performed in the positive region of the torsion characteristics. In this case, the clutch plate 12 and retaining plate 13 twist in the rotating direction R1 with respect to the output rotary member 3, which includes the hub 6.

When the torsion angle is small, only the two second coil springs 36 are compressed, and only the first friction generating portion 70 operates. Thus, the two first coil springs 33 are not compressed, and the second friction generating portion 71 does not operate. More specifically, the circumferential end support portion 65 on the R1 side of the flange 8 extends through the slit 48 in the first seat member 34A, therefore, the first coil spring 33 is not compressed. The float member 80 is coupled via the second friction generating portion 71 with the plates 12 and 13 for integral rotation, and slides on the hub 6 so that the second friction generating portion 71 does not generate the friction. As a result, the characteristics of a low rigidity and a low hysteresis torque can be obtained.

When the torsion angle reaches θ2, the circumferential end support portion 65 on the R1 side of the first window aperture 53 comes into contact with the second contact surface 42 of the first seat member 34A and the claw 81c of the float member 80. Thereafter, the two first coil springs 33 are compressed in parallel with the two second coil springs 36. The float member 80 rotates together with the hub 6, and slides in the rotating direction with respect to the third and fourth bushings 76 and 78. Thus, the second friction generating portion 71 operates in parallel with the first friction generating portion 70. As a result, high rigidity and high hysteresis torque torsion characteristics can be obtained. When the torsion angle reaches, e.g., 10.5 degrees, the first and second seat members 34A and 34B come into contact with each other, and the third seat members 37 come into contact with each other so that the operation of the damper mechanism stops.

Description will now be given on the case in the operation starting from the neutral state in FIG. 11 and performed in the negative region of the torsion characteristics. In this case, the clutch retaining plates 12 and 13 twist in the rotating direction R2 with respect to the output rotary member 3, which includes the hub 6. When the torsion angle is small, only the two coil springs 36 are compressed, and only the first friction generating portion 70 operates. Thus, the two first coil springs 33 are not compressed, and the second friction generating portion 71 does not operate. More specifically, the circumferential end support portion 65 on the R2 side of the flange 8 extends through the slit 48 in the second seat member 34B. Therefore, the first coil spring 33 is not compressed. The float member 80 is coupled via the second friction generating portion 71 with the plates 12 and 13 for integral rotation, and slides on the hub 6 so that the second friction generating portion 71 does not generate the friction. As a result, the characteristics of a low rigidity and a low hysteresis torque can be obtained. The torsional rigidity in this state is approximately equal to a quarter of the torsional rigidity in the positive high-rigidity region from 2°–10.5° in FIG. 12.

When the torsion angle reaches θ1, the circumferential end support portion 65 on the R2 side of the first window aperture 53 comes into contact with the second contact surface 42 of the second seat member 34B. Thereafter, the two first coil springs 33 are compressed in parallel with the two second coil springs 36. However, the float member 80 rotates together with the plates 12 and 13 with the second friction generating portion 71 therebetween, and slides with respect to the hub 6. Therefore, the second friction generating portion 71 does not generate the friction. As a result, the desired rigidity and hysteresis torque torsion characteristics can be obtained.

According to the damper mechanism of the present invention, as described above, the torsion characteristics exhibit different torsional rigidities on the positive and negative sides, respectively, and further exhibit different hysteresis torques on the positive and negative sides, respectively. Thereby, the desired torsion characteristics, which are good overall, can be achieved. In the prior art, since there is no difference in torsion characteristics between the positive and negative sides, the following problems arise in connection with the vibration damping performance.

(1) A high rigidity and a high hysteresis torque cause insufficient damping rate on the negative side.

(2) A high rigidity and a low hysteresis torque cause large vibrations in rotation speed during resonance on the positive side.

(3) A low rigidity and a high hysteresis torque cause insufficient damping rate on the negative side.

(4) A low rigidity and a low hysteresis torque cause large vibrations in rotation speed during resonance on the positive side.

From the above, it can be understood that the high hysteresis torque is preferable on the positive side, and the low hysteresis torque is preferable on the negative side. In the prior art, structures having such torsion characteristics have been proposed that the hysteresis torque on the positive side is different from that on the negative side. In addition to the difference in hysteresis torque, the invention provides the difference in torsional rigidity so that more preferable torsion characteristics can be achieved.

More specifically, a high hysteresis torque is achieved in the high rigidity region (2°–10.5° in FIG. 12) on the positive side, and a low hysteresis torque is achieved in the low rigidity region (0°–15° in FIG. 12) on the negative side. As a result, variations in rotation speed, which may occur when passing through the resonance point, can be suppressed on the positive side of the torsion characteristics, and good damping rates can be achieved throughout the negative side of the torsion characteristics.

In particular, the clutch disk assembly 1 according to the present invention can be appropriately employed for improving the vibration characteristics caused by the vehicle structure of the front-engine and front-drive vehicle. More specifically, an FF vehicle employs a high rigidity drive system, and therefore has the following vibration characteristics. First, in a FF vehicle, the resonance point remains in the practical operation range even if the torsional rigidity is reduced for improving the noise and vibration performances. Second, if the variation in engine speed is different between the positive side (acceleration side) and the negative side (deceleration side) of the torsion characteristics, and no difference is present in torsion characteristics between the positive and negative sides, good damping performance may be achieved on one side, but cannot be achieved on the other side. Thus, it is impossible to provide good damping performance on both sides.

The friction generating mechanism 69 has two friction generating portions, i.e., the first and second friction generating portions 70 and 71, and the second friction generating portion 71 operates only on the positive side. Therefore, it is possible to control independently the hysteresis torque generated on the positive and negative sides. More specifically, the hysteresis torque on the positive side can be controlled by changing partially or entirely the third bushing 76, fourth bushing 78 and second conical spring 77 in the second friction generating portion 71. This change does not affect the hysteresis torque on the negative side. The hysteresis torque on the negative side can be controlled by changing partially or entirely the first bushing 72, second bushing 74 and first conical spring 73 in the first friction generating portion 70. This change causes a change in the hysteresis torque on the positive side. However, the hysteresis torque generated by the first friction generating portion 70 is much smaller than the hysteresis torque generated by the second friction generating portion 71. Therefore, the above change does not significantly affect the hysteresis torque on the positive side. In contrast to this, a structure has been proposed such that one conical spring is employed for generating friction on a plurality of members, and the number of friction surfaces on the positive side is different from that on the negative side for providing different hysteresis torques on the positive and negative sides, respectively. According to this structure, change of the conical spring for controlling the hysteresis torque on the positive side significantly affects the hysteresis torque on the negative side.

The present invention is not restricted to the clutch disk assembly of the foregoing embodiment.

The damper mechanism according to the present invention can provide characteristics of a high rigidity and a high hysteresis torque on the positive side (acceleration side) of the torsion characteristics, and can also provide characteristics of a low rigidity and a low hysteresis torque on a negative side (deceleration side) of the torsion characteristics. As a result, the variations in rotation speed can be suppressed on the positive side of the torsion characteristics when passing through the resonance point, and a good damping rate can be entirely achieved on the negative side of the torsion characteristics.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A damper mechanism comprising:
    a first rotary member;
    a second rotary member being rotatable with respect to said first rotary member;
    a plurality of elastic members being arranged to be compressed when relative rotation occurs between said first and second rotary members in a rotating direction, and exhibiting a higher rigidity in a positive rotational side of torsion characteristics than a negative rotational side; and
    a friction generating mechanism being arranged to generate friction when relative rotation occurs between said first and second rotary members, and arranged to generate a larger friction on said positive rotational side of said torsion characteristics than said negative rotational side, said friction generating mechanism having a first friction generating portion and a second friction generating portion, said first friction generating portion being configured to operate throughout the entirety of said positive and negative rotational sides of said torsion characteristics, said second friction generating portion being configured to operate only on said positive rotational side of said torsion characteristics.

2. The damper mechanism according to claim 1, wherein said first friction generating portion has a first friction member to generate friction between said first and second rotary members, and a first biasing member to bias said first friction member, and
said second friction generating portion has a second friction member to generate friction between said first and second rotary members, and a second biasing member to bias said second friction member.

3. The damper mechanism according to claim 1, further comprising,
    at least one elastic assembly that comprises,
        a coil spring that comprises one of said plurality of elastic members,
        a first spring seat configured to contact a first end of said coil spring and arranged on a positive rotational side, and
        a second spring seat configured to contact a second end of said coil spring and arranged on a negative rotational side.

4. The damper mechanism according to claim 3, wherein said first rotary member has a first aperture with a pair of first circumferential end support portions,
said second rotary member has a second aperture with a pair of second circumferential end support portions, and
said elastic member is arranged inside said first and second apertures.

5. The damper mechanism according to claim 3, wherein said first spring seat comprises,
    a first seat surface arranged on a negative rotational side and configured to contact said coil spring,
    a pair of first projections that extends on a positive rotational side, and
    a first slit arranged between said pair of first projections, said first slit has a first contact surface, and
said second seat comprises,
    a second seat surface arranged on said positive rotational side and configured to contact said coil spring,
    a pair of second projections that extends on said negative rotational side, said pair of second projections being longer than said pair of first projections, and
    a second slit arranged between said pair of second projections, said second slit has a second contact surface.

6. The damper mechanism according to claim 5, wherein said first rotary member has a first aperture with a pair of first circumferential end support portions,
said second rotary member has a second aperture with a pair of second circumferential end support portions, and
said elastic member is arranged inside said first and second apertures.

7. The damper mechanism according to claim 6, wherein in a damper neutral position said first and second seat members contact said pair of first circumferential end support portions,
said first seat member and one of said pair of second circumferential end support portions comprise a second rotational gap on said positive rotational side, and
said second seat member and one of said pair of second circumferential end support portions comprise a first rotational gap on said negative rotational side, said first gap being larger than said second rotational gap.

8. The damper mechanism according to claim 7, wherein a first of said pair of second circumferential end support portions is configured to contact said first contact surface, and a second of said pair of second circumferential end support portions is configured to contact said second contact surface.

9. The damper mechanism according to claim 7, wherein
said first rotational gap is approximately 15°, and
said second rotational gap is approximately 2°.

10. A damper mechanism comprising:
a first rotary member, said first rotary member having a first aperture with a pair of first circumferential end support portions;
a second rotary member being rotatable with respect to said first rotary member, said second rotary member having a second aperture with a pair of second circumferential end support portions;
a plurality of elastic members being arranged to be compressed when relative rotation occurs between said first and second rotary members in a rotating direction, and exhibiting a higher rigidity in a positive rotational side of torsion characteristics than a negative rotational side, said plurality of elastic members being arranged inside said first and second apertures;
a friction generating mechanism being arranged to generate friction when relative rotation occurs between said first and second rotary members, and arranged to generate a larger friction on said positive rotational side of said torsion characteristics than said negative rotational side, said friction generating mechanism having a first friction generating portion and a second friction generating portion, said first friction generating portion being configured to operate throughout the entirety of said positive and negative rotational sides of said torsion characteristics, said first friction generating portion comprising,
a first friction member to generate friction between said first and second rotary members, and
a first biasing member to bias said first friction member,
said second friction generating portion being configured to operate only on said positive rotational side of said torsion characteristics, said second friction generating portion comprising,
a second friction member to generate friction between said first and second rotary members, and
a second biasing member to bias said second friction member; and at least one elastic assembly that comprises,
a coil spring that comprises one of said plurality of elastic members,
a first spring seat configured to contact a first end of said coil spring and arranged on a positive rotational side, and
a second spring seat configured to contact a second end of said coil spring and arranged on a negative rotational side, in a damper neutral position said first and second seat members contact said pair of first circumferential end support portions,
said first seat member and one of said pair of second circumferential end support portions comprise a second rotational gap on said positive rotational side, and
said second seat member and one of said pair of second circumferential end support portions comprise a first rotational gap on said negative rotational side, said first rotational gap being larger than said second rotational gap.

11. The damper mechanism according to claim 10, wherein
said first rotational gap is approximately 15°, and
said second rotational gap is approximately 2°.

12. A damper mechanism comprising:
a first rotary member having a first aperture with a pair of first circumferential end support portions;
a second rotary member being rotatable with respect to said first rotary member; said second rotary member having a second aperture with a pair of second circumferential end support portions;
a plurality of elastic members being arranged to be compressed when relative rotation occurs between said first and second rotary members in a rotating direction, and exhibiting a higher rigidity in a positive rotational side of torsion characteristics than a negative rotational side;
at least one elastic assembly that comprises,
a coil spring that comprises one of said plurality of elastic members,
a first spring seat configured to contact a first end of said coil spring and arranged on a positive rotational side,
a second spring seat configured to contact a second end of said coil spring and arranged on a negative rotational side,
in a damper neutral position said first and second spring seats contact said pair of first circumferential end support portions, and are separated from said second circumferential end support portions; and
a friction generating mechanism being arranged to generate friction when relative rotation occurs between said first and second rotary members, and arranged to generate a larger friction on said positive rotational side of said torsion characteristics than said negative rotational side.

13. The damper mechanism according to claim 12, wherein in said damper neutral position said first gap is larger than said second rotational gap.

14. The damper mechanism according to claim 13, wherein
said first rotational gap is approximately 15°, and
said second rotational gap is approximately 2°.

15. The damper mechanism according to claim 12, wherein
said first spring seat comprises,
a first seat surface arranged on a negative rotational side and configured to contact said coil spring,
a pair of first projections that extends on a positive rotational side, and
a first slit arranged between said pair of first projections, said first slit has a first contact surface, and
said second seat comprises,
a second seat surface arranged on said positive rotational side and configured to contact said coil spring,
a pair of second projections that extends on said negative rotational side, said pair of second projections being longer than said pair of first projections, and
a second slit arranged between said pair of second projections, said second slit has a second contact surface.

16. The damper mechanism according to claim 15, wherein a first of said pair of second circumferential end support portions is configured to contact said first contact surface, and a second of said pair of second circumferential end support portions is configured to contact said second contact surface.

17. The damper mechanism according to claim 16, wherein said first rotational gap is approximately 15°, and said second rotational gap is approximately 2°.

18. The damper mechanism according to claim 12, wherein said friction generating mechanism is arranged to operate in parallel with said plurality of elastic members.

* * * * *